United States Patent
Hunold et al.

(10) Patent No.: US 8,528,433 B2
(45) Date of Patent: Sep. 10, 2013

(54) DRIVE ASSEMBLY COMPRISING TWO CLUTCHES AT THE INPUT END, AND METHOD FOR THE OPERATION THEREOF

(75) Inventors: Bernard Hunold, Friedrichshafen (DE); Eckhardt Lubke, Friedrichshafen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 182 days.

(21) Appl. No.: 13/265,386

(22) PCT Filed: May 7, 2010

(86) PCT No.: PCT/EP2010/056243
§ 371 (c)(1),
(2), (4) Date: Oct. 20, 2011

(87) PCT Pub. No.: WO2010/130647
PCT Pub. Date: Nov. 18, 2010

(65) Prior Publication Data
US 2012/0103116 A1 May 3, 2012

(30) Foreign Application Priority Data
May 14, 2009 (DE) .................. 10 2009 003 108

(51) Int. Cl.
*F16H 3/08* (2006.01)
(52) U.S. Cl.
USPC ................................................. 74/330
(58) Field of Classification Search
USPC ..................... 74/330, 331, 333, 335, 340
See application file for complete search history.

(56) References Cited

U.S. PATENT DOCUMENTS

| | | | |
|---|---|---|---|
| 2,599,801 A * | 6/1952 | Youngren et al. ............... | 74/330 |
| 3,774,460 A | 11/1973 | Browning et al. | |
| 3,906,817 A * | 9/1975 | Kreitzberg ...................... | 74/745 |
| 4,191,072 A | 3/1980 | Ehrlinger et al. | |
| 5,890,392 A * | 4/1999 | Ludanek et al. ................. | 74/331 |
| 6,095,001 A * | 8/2000 | Ruehle et al. ................... | 74/331 |
| 2004/0025612 A1 | 2/2004 | Ahnert et al. | |
| 2008/0254932 A1 | 10/2008 | Heinzelmann | |
| 2009/0107289 A1 | 4/2009 | Borntrager | |
| 2010/0242638 A1 | 9/2010 | Steffens | |

FOREIGN PATENT DOCUMENTS

| | | |
|---|---|---|
| DE | 2 325 699 | 1/1974 |
| DE | 25 56 669 B1 | 3/1978 |
| DE | 101 52 859 A1 | 5/2003 |
| DE | 101 53 442 A1 | 5/2003 |
| DE | 10 2005 046 894 A1 | 5/2007 |
| DE | 10 2006 024 370 A1 | 12/2007 |

(Continued)

*Primary Examiner* — Ha D Ho
(74) *Attorney, Agent, or Firm* — Davis & Bujold, PLLC

(57) ABSTRACT

A drive assembly for a motor vehicle with a transmission that can be powershifted and comprises splitter and main transmissions, input and output shafts, loose and fixed gearwheels which form transmission gears, and shifting devices for coupling the loose gearwheels to at least one of the transmission shafts. The splitter transmission has first and second gear constants, and the inputs of the first and second gear constants can be driven by the outputs of two clutches whose inputs can be driven by a motor. One of the clutches is a frictional starting and shifting clutch and the other is a claw clutch, the inputs of the first and second gear constants can be driven alternatively by the output of the starting and shifting clutch, and that by way of the output of the claw clutch the input of only one of the gear constants can be driven.

26 Claims, 2 Drawing Sheets

(56) References Cited

FOREIGN PATENT DOCUMENTS

| | | |
|---|---|---|
| DE | 10 2007 053 674 A1 | 1/2009 |
| DE | 10 2008 001 200 A1 | 10/2009 |
| EP | 1 921 349 A1 | 5/2008 |
| WO | 01/88409 A2 | 11/2001 |
| WO | 03/085287 A2 | 10/2003 |
| WO | 2007/134943 A1 | 11/2007 |
| WO | 2009/127473 A1 | 10/2009 |

* cited by examiner

DRIVE ASSEMBLY COMPRISING TWO CLUTCHES AT THE INPUT END, AND METHOD FOR THE OPERATION THEREOF

This application is a National Stage completion of PCT/EP2010/056243 filed May 7, 2010, which claims priority from German patent application serial no. 10 2009 003 108.1 filed May 14, 2009.

FIELD OF THE INVENTION

The invention concerns a drive assembly for a motor vehicle, with a transmission which, as a power shiftable group transmission, comprises a splitter group and a main transmission, in which the group transmission has a transmission input shaft and a transmission output shaft, in which there are loose gearwheels and fixed gearwheels which are arranged on transmission shafts and form transmission gear ratios, in which there are shifting devices for coupling the loose gearwheels to at least one of the transmission shafts as necessary, in which the splitter group comprises at least a first and second gear constant, and in which the input sides of the first and second gear constants can be driven by the output sides of a clutch device that comprises two clutches whose input sides can be driven by a drive motor.

BACKGROUND OF THE INVENTION

As is known, group transmissions consist of two or more transmission groups usually arranged in series, the combination of which can produce a large number of gears. Increasingly, they are designed as semi-automatic change-speed transmissions, for example consisting of an input transmission or splitter group, a main transmission and a downstream or range group. Such transmissions are used especially in utility vehicles since they provide a particularly fine gradation of gears, for example with 12 or 16 gears, and they work with high efficiency. For a smaller number of gears, configurations having only a main transmission and a splitter group or a main transmission and a range group are also possible. Furthermore, compared with manually shifted transmissions they are very comfortable to use, and compared with conventional automatic transmissions they are particularly economical to manufacture and operate.

As a result of their structure, conventional multi-group transmissions, like all manual or semi-automatic transmissions that are not shifted under load, are characterized by a traction force interruption during gearshifts since the force flow from the drive motor is always interrupted by disengaging a clutch so that the engaged gear can be disengaged while free from load, the transmission and the drive motor can be synchronized to a connection rotational speed while in a neutral position, and the target gear can then be engaged. This results in restricted driving performance due to a loss of speed, and sometimes in higher fuel consumption. Whereas in passenger cars the slight loss of driving dynamics caused by this traction force interruption is usually perceived as no more than annoying, for example in the case of a sporty driving style, with heavy utility vehicles driving uphill, the speed can decrease to a point where an upshift to a desired target gear becomes impossible and undesired downshifts, crawl driving or even additional starting processes are required.

To help out in such situations, solutions have already been proposed which reduce or completely avoid these traction force interruptions. From DE 10 2006 024 370 A1 by the present applicant such a semi-automatic multi-group transmission is known, which comprises a splitter group as the input transmission, a main transmission and a range group as the output group or downstream transmission. The design of this known multi-group transmission with the splitter group and the main transmission enables a direct gear to be engaged as an intermediate gear during a gearshift. For this, a temporary connection is formed by means of a powershift clutch between an input shaft of the input transmission and a main shaft of the main transmission. This relieves the load on the main transmission and the splitter group so that the engaged gear can be disengaged, the transmission synchronized and the target gear engaged, while the starting clutch remains coupled. During this the powershift clutch transmits a motor torque to the transmission output so that a dynamical torque that becomes free during a rotational speed drop between the original and target gears is largely used to compensate the traction force interruption.

The powershift clutch of the multi-group transmission described in DE 10 2006 024 370 A1, which is a friction clutch, can be arranged between the input transmission or splitter group and the main transmission, or between the frictional starting clutch and the splitter group. In any case the starting clutch and the powershift clutch are made and arranged separately, and each is actuated by a respective associated control device.

Another multi-group transmission is known from DE 10 2005 046 894 A1 by the present applicant. This transmission comprises a main group and a range group downstream from it. A drive motor can be connected by means of a frictional starting or motor clutch to the motor-side end of a transmission input shaft. In turn, the transmission input shaft can be connected to an output shaft of the transmission by means of a frictional powershift clutch arranged within the range transmission. The other end of the transmission input shaft is connected to an input side of the powershift clutch, and an output shaft of the main transmission is coupled to an output side of the powershift clutch.

The range transmission is of planetary design, such that the output shaft is connected to a planetary carrier and the output side of the powershift clutch can be coupled, via a sun gear and a planetary gearset carried by the planetary carrier, to the output shaft. In this way a traction force interruption during a shifting process of the main transmission can be avoided. To avoid a traction force interruption during a range shift in the range group, the output side of the powershift clutch can also be connected directly to the planetary carrier and hence to the output shaft. In this way the traction force can also be supported during shifting processes involving a range shift. In this multi-group transmission as well, the starting clutch and the powershift clutch are arranged separately and are in the form of friction clutches.

Finally, from the not previously published German patent application DE 10 2008 001 200 a multi-group transmission of a motor vehicle is known, in which means are provided for engaging an intermediate gear in order to reduce or avoid traction force interruptions during gearshifts. This group transmission comprises an input or splitter group with two gear constants, a main transmission with three further gear-ratio gearsets and a range group made as a planetary transmission. Parallel to a transmission input shaft are arranged two countershafts on which the fixed gearwheels of the gear-ratio gearsets are fixed. Between the two ratio gearsets of the gear constants of the splitter group, between the ratio gearset of the second gear constant and the first ratio gearset of the main transmission and between the two further ratio gearsets of the main transmission there is arranged in each case a respective synchronized shifting device that acts on both sides, by means of which loose gearwheels of the gearsets can be connected to associated transmission shafts in a rotationally fixed manner.

For this group transmission to be designed as simply and compactly as possible and to be simple to control and comfortable and energy-saving in use, between a drive motor and a transmission input there is arranged a dual clutch device comprising two friction clutches, one of these clutches being actuated as a starting element to connect a driveshaft of the drive motor to a transmission input shaft and the other clutch being actuated as a powershift element to engage an intermediate gear by connecting the driveshaft of the drive motor to a main shaft of the transmission which extends at least partially through the transmission.

SUMMARY OF THE INVENTION

Against this background the purpose of the present invention is to propose a simply designed and inexpensively manufactured drive assembly of the type described, in which the group transmission can be power-shifted at least in its higher gears. A further objective is to indicate a method of operating such a drive assembly.

These objectives are achieved by the characteristics specified in the independent claims, while advantageous design features and further developments of the invention emerge from the respectively associated subordinate claims.

The invention is based on recognition that compared with friction clutches, claw clutches have a more simple structure and can therefore be produced more cheaply. A group transmission with a clutch device having two clutches, one of them being a frictional starting and shifting clutch and a second one being a claw clutch, makes it possible in an appropriately configured transmission to carry out powershifts between transmission gears in which the splitter transmission is involved, and powershifts at least between the two highest transmission gears, for example between gears 11 and 12.

It is further recognized that compared with respective separate clutch structures, the arrangement of a frictional starting and shifting clutch and an interlocking claw clutch in a common housing saves axial fitting space when both the clutch components and the actuators for actuating the clutches are arranged, radially and axially nested inside the clutch housing.

Furthermore the insight was also gained that with this arrangement of a friction clutch and a claw clutch in a common clutch housing, the shifting means of the claw clutch can be arranged with a comparatively large effective diameter so that the shifting means, i.e. the clutch claws geometrically appropriately designed for this, can separate easily and automatically from one another when the actuator force is removed. This is advantageous above all in relation to the co-operation of the drive assembly with an anti-blocking system of the vehicle, since the operation of the anti-blocking system is improved by quick interruption of the propulsion of the vehicle.

Accordingly, the invention starts from a drive assembly for a motor vehicle with a transmission which, as a powershiftable group transmission, is formed with a splitter transmission, a main transmission and if necessary a range transmission, in which the group transmission has a transmission input shaft and a transmission output shaft, in which there are loose gearwheels and fixed gearwheels which are arranged on transmission shafts and form transmission gears, in which there are shifting devices for coupling the loose gearwheels to at least one of the transmission shafts in a rotationally fixed manner as necessary, in which the splitter transmission comprises at least two gear constants, and in which the input sides of the gear constants can be driven by the output sides of a clutch device comprising two clutches, whose input sides can be driven by a drive motor.

To achieve the stated objective, as regards the drive assembly it is also provided that one of the two clutches of the clutch device is a frictional starting and shifting clutch and the other is an interlocking claw clutch, and that by means of the output side of the starting and shifting clutch at least the input sides of the first and second gear constants can be driven alternatively to one another, and that by means of the output side of the claw clutch the input side of one of the gear constants can be driven.

In a further development of the invention the splitter group and the main group are structurally combined with the transmission input shaft, the main transmission shaft and two countershafts arranged parallel thereto.

Furthermore, in a first embodiment variant it is provided that the clutch device is made as a dual clutch device which comprises the starting and shifting clutch, the claw clutch and two clutch actuators respectively associated with the two clutches, such that the two clutches have a common clutch housing and, in a preferred embodiment, such that the coupling means of the claw clutch are arranged radially outwardly in the area of the clutch housing.

Owing to the axially and radially closely adjacent arrangement of the coupling means of the starting, shifting and the claw clutches, their actuators can be radially and axially nested one in the other, whereby an axially very short dual clutch assembly is obtained. Furthermore, in this design the claw shifting device of the claw clutch can be arranged radially very far on the outside so that comparatively large torques can be transmitted by the claw clutch. Moreover, the location of the teeth of the claw clutch on as large as possible an effective diameter is advantageous in relation to smaller self-retaining forces when the claw teeth are inclined. Finally, the arrangement of the claw clutch in the space radially within the starting and shifting clutches enables the housing of the vehicle transmission to be kept very short.

With regard to the starting and shifting clutch, it is provided that on the input side it comprises a cup spring which is fixed on the clutch housing and can be actuated by a control element of an actuator. In addition the starting and shifting clutch comprises a pressure plate which, in the non-actuated condition of this clutch, is acted upon by a closing force. Furthermore, the pressure plate of this friction clutch has radial openings through which annular segments arranged on the clutch housing project radially inward with some play. The function of these annular segments will be explained later.

In a further design of the drive assembly it is provided that the starting and shifting clutch and the claw clutch both comprise a respective torsion fluctuation damper, by means of which rotational fluctuations of the crankshaft of an internal combustion engine that powers the drive assembly are damped. The two torsion fluctuation dampers are preferably arranged axially one behind the other in the clutch housing.

The input side of the torsion fluctuation damper of the starting and shifting clutch is connected to a clutch disk, while its output side is connected by a sleeve to the transmission input shaft in a rotationally fixed manner. Furthermore, a synchronized shifting device is arranged in the area of the end of the transmission input shaft remote from the motor, by means of which the transmission input shaft can be connected alternatively to a loose gearwheel of the first gear constant or to a loose gearwheel of the second gear constant of the splitter transmission.

The torsion fluctuation damper of the claw clutch is connected in a rotationally fixed manner to a hollow shaft arranged radially on the inside, this shaft being mounted and able to rotate on the transmission input shaft. Furthermore, this torsion fluctuation damper comprises at least one springy-elastic element and is connected radially on the outside with a driver disk which, in a first design variant of the claw clutch, has radial teeth in the area of its radial end, which serve as coupling means of the claw clutch.

Regarding the already mentioned annular segments that pass radially through the pressure plate of the starting and shifting clutch, it is provided that these are arranged on the radially inner side of the clutch housing and are connected to it in a rotationally fixed manner. In addition, these annular segments have, on their face axially directed toward the driver disk, radial teeth which also serve as coupling means of the claw clutch. Thus, in the coupled condition of the clutch the radial teeth on the annular segments and those of the driver disk engage in one another with interlock, in such a manner that drive torque can be transmitted by the clutch.

The teeth on the clutch side can also be integrated in the part of the clutch connected to the pressure plate of the clutch. The teeth of the driver disk can also be arranged in segments, and the segmenting can be done for example by centering means on the driver disk.

Furthermore, in this first embodiment variant the claw clutch comprises an actuating piston of the associated actuator, which can be pressed axially against a tooth-free face of the driver disk to engage the claw clutch. In this case it is preferably provided that at least one springy-elastic element of the second torsion fluctuation damper is designed to enable an axial deflection of the driver disk. In this connection it is provided that the at least one springy-elastic element of the torsion fluctuation damper of the claw clutch is designed such that in the non-actuated condition the actuating piston of the actuator of the claw clutch is pushed by the springy-elastic element to its disengaged position. Thanks to this design feature the actuating piston of the actuator of the claw clutch needs no separate restoring means in order to be moved from its actuating position to its non-actuating position.

According to a further design feature of the first embodiment variant of a drive assembly according to the invention, it is provide that the hollow shaft carrying the torsion fluctuation damper has at its end near the transmission an output gearwheel, which serves as a loose gearwheel of the first gear constant of the splitter group. The hollow shaft is preferably mounted by means of a needle bearing on the transmission input shaft and by means of a grooved ball bearing on a transmission housing.

A further design feature of the first embodiment variant of a drive assembly according to the invention provides that the claw clutch is arranged radially and axially inside the fitting space available in an axial extension of a pressure plate of the frictional starting and shifting clutch. This is how the axially and radially advantageously nested structure of the dual clutch consisting of the friction clutch and the claw clutch is obtained.

In another design of the invention, the radial teeth on the annular segments of the clutch housing and on the driver disk of the claw clutch have inclined tooth flanks. This makes the tooth flanks self-repelling, so that if the torque falls below a small torque value or holding torque determined by the tooth flank geometry and the friction forces, the driver disk is returned to its disengaging position of the actuating piston by the action of the springy-elastic element of the torsion fluctuation damper of the claw clutch.

A second embodiment of a drive assembly according to the invention, whose structure is otherwise largely the same in the area of the group transmission, provides that with regard to the clutch device, the entire starting and shifting clutch and the input side and the torsion fluctuation damper of the claw clutch are accommodated within the clutch housing thereof of the clutch device. In addition, in this case it is provided that the actuator for the starting and shifting clutch is arranged inside the actuator housing connected to the clutch housing. Differing from the design form of the first variant, it is provided that the coupling means of the claw clutch are arranged or formed in the area of the loose gearwheel of the first gear constant.

This second embodiment variant is regarded as less advantageous than the first embodiment because the coupling means of the claw clutch are arranged on a comparatively small effective diameter, and because the coupling means of the claw clutch are located not in the dry space of the clutch housing, but in the wet space of the splitter transmission. However, the second variant has the advantage compared with known drive assemblies of the type concerned, that it comprises a claw clutch which is inexpensive to manufacture and takes up a comparatively small axial space.

With this claw clutch, for reasons of structural functionality it is provided that the hollow shaft connected to the output side of the torsion fluctuation damper of the claw clutch has at its end close to the transmission axial teeth formed radially on the outside, and a shifting ring held and able to move axially with its inner teeth on these outer axial teeth. On its face directed toward the loose gearwheel of the first gear constant the shifting ring has radial teeth, which co-operate with corresponding radial teeth on the loose gearwheel of the first gear constant as further shifting means of the claw clutch.

The shifting ring of the claw clutch can be displaced axially by an actuator and is supported on the transmission housing by a release bearing. Moreover, in this second embodiment variant of the drive assembly according to the invention, it is provided that the shifting ring is acted upon by a restoring spring with a force directed away from the loose gearwheel of the first gear constant, so that when the actuator of the claw clutch is not exerting an actuating force the shifting ring is automatically pushed clear of the shifting teeth on the loose gearwheel of the first gear constant.

In this second design form of the claw clutch as well, it is preferably provided that the radial teeth on the shifting ring and on the loose gearwheel of the first gear constant have axially orientated inclined tooth flanks which, depending on their design, do or do not favor disengagement of the shifting means of the claw clutch.

In addition the invention concerns a method for operating a drive assembly with a group transmission and a clutch device comprising two clutches, one of these two clutches being a friction clutch and the other a claw clutch, which embodies at least some of the features described above. To carry out a gearshift process of the group transmission, in which the first and second gear constants of the splitter group are involved, without any traction force interruption, it is provided that:

in a first step the drive torque is passed exclusively along a first torque path that includes the frictional starting and shifting clutch, the transmission input shaft, the loose gearwheel of the second gear constant and the main transmission shaft, in a second step the starting and shifting clutch is operated with slip, and the input side of the clutch device is brought close to a target rotational speed of the target gear, in a third step the claw clutch is engaged and the drive torque is passed along the first torque path and also along a second torque path, this second torque path including the claw clutch, the loose gearwheel of the first gear constant, the fixed gearwheels of the first and second gear constants, the loose gearwheel of the second gear constant and the main transmission shaft, and in a fourth step the starting and shifting clutch is engaged and the drive torque is passed exclusively to the main transmission shaft along the second torque path that contains the claw clutch.

Thanks to the continuous maintenance of torque transmission between the input side of the clutch device and the main transmission shaft during the shifting process, a gearshift is carried out without traction force interruption.

To create the first torque path, with the starting and shifting clutch engaged the transmission input shaft is connected in a rotationally fixed manner to the loose gearwheel of the second gear constant by means of a shifting device arranged between the first and second gear constants, and in addition this loose gearwheel of the second gear constant is connected in a rotationally fixed manner to the main transmission shaft by means of a further shifting device.

To create the second torque path it is provided that with the claw clutch engaged and the loose gearwheel of the first gear constant driven by the output side of the claw clutch, and with the first shifting device disengaged, the loose gearwheel of the second gear constant is connected in a rotationally fixed manner to the main transmission shaft by means of the further shifting device.

According to another further development of the method according to the invention it is provided that after the claw clutch has been engaged, the shifting device arranged between the first and second gear constants is changed from its closing position on the loose gearwheel of the second gear constant to its neutral position. This can be advantageous for operating situations in which, during a sharp braking process, for example due to the response of an anti-blocking system of the vehicle, a rapid interruption of the drive torque is desired. Thanks to the design of the claw clutch this is ensured, since in the absence of an actuating force by the associated actuator, its shifting means disengage spontaneously. In such an operating situation, with the shifting device concerned in its neutral position, regardless of the actuation status of the starting and shifting clutch no drive torque can be passed through to the transmission output shaft.

Finally, in accordance with the method it can be provided that when the shifting device arranged between the first and second gear constants has been changed to its neutral position the starting and shifting clutch is engaged, so that an associated clutch actuator does not have to exert an actuating force continuously in order to keep the starting and shifting clutch disengaged.

BRIEF DESCRIPTION OF THE DRAWINGS

Below, the invention is explained in more detail with reference to two example embodiments, this also being assisted by attached drawings with two figures, which show.

DETAILED DESCRIPTION OF THE PREFERRED EMBODIMENTS

Figure 1:
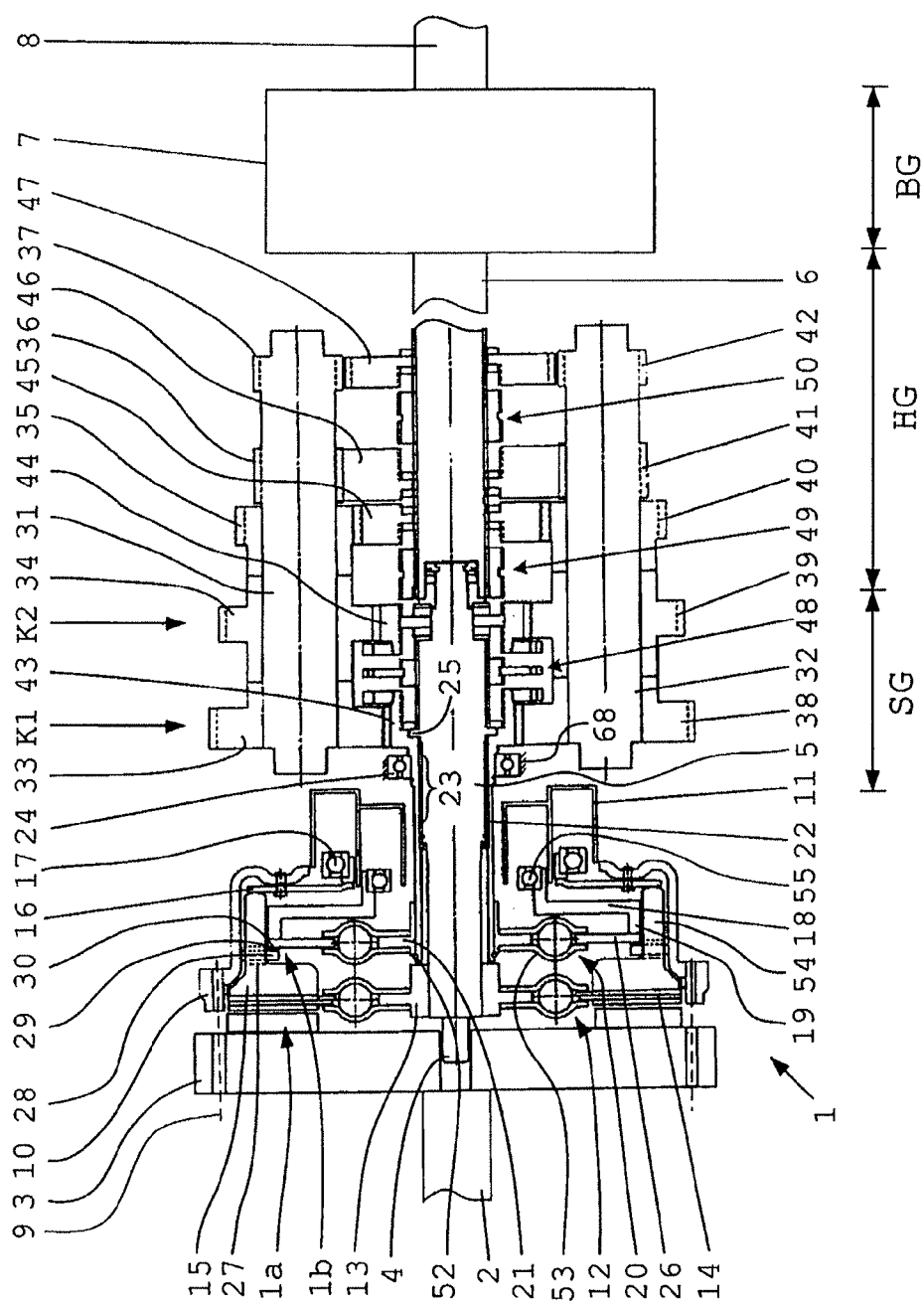
FIG. 1: A schematic longitudinal section through a drive assembly of a motor vehicle having a vehicle transmission in the form of a group transmission, and through a clutch device.

Thus, FIG. 1 shows a first example embodiment of a drive assembly according to the invention for a motor vehicle, preferably for a utility vehicle, with a clutch device 1 formed as a dual clutch 1a, 1b and a stepwise change-speed transmission made as a group transmission SG, HG, BG. The clutch housing 10 of the clutch device 1 is connected by a screw joint 9 to a flywheel 3 which is attached in a rotationally fixed manner to the crankshaft 2 of an internal combustion engine (not shown). The input sides of the two clutches 1a, 1b of the clutch device 1 can be driven by the clutch housing 10.

In this case the clutch device 1 comprises a starting and shifting clutch 1a in the form of a friction clutch and an unsynchronized claw clutch 1b. The output side of the starting and shifting clutch 1a is connected in a rotationally fixed manner to the transmission input shaft 5, while the output side of the claw clutch 1b has at its end near the transmission a gearwheel 43, which serves as the loose gearwheel of the first gear constant K1.

The group transmission comprises a splitter group SG with two gear constants K1 and K2, whose loose gearwheels 43 and 44 respectively are mounted to rotate on the transmission input shaft 5 and mesh with associated fixed gearwheels 33, 34; 38, 39 on two countershafts 31, 32. As already mentioned, the loose gearwheel 43 of the first gear constant K1, is connected in a rotationally fixed manner with the output of the claw clutch 1b and is mounted to rotate on the transmission input shaft 5.

Furthermore, the loose gearwheels 43 and 44 of the two gear constants K1 and K2 can be connected in a rotationally fixed manner to the transmission input shaft 5 by means of a synchronized shifting device 48 with a two-sided action. At the end of the group transmission SG, HG, BG on the drive motor side, the transmission input shaft 5 is supported radially on a transmission housing 68 by a roller bearing 24.

In addition the group transmission has a main transmission HG which can produce three gear ratios with loose gearwheels 45, 46, 47 arranged to rotate on a main transmission shaft 6 and with respectively associated fixed gearwheels 35, 36, 37; 40, 41, 42 on the two countershafts 31, 32. To connect the loose gearwheels 45, 46, 47 to the main transmission shaft in a rotationally fixed manner, respective associated shifting devices 49 and 50 are provided, which are connected to the main transmission shaft in a rotationally fixed manner but can be displaced axially.

The main transmission HG is followed by a range group BG, which is here indicated only schematically and is designed as a simple planetary transmission 7. The input side of this range transmission BG is formed by the main transmission shaft while a transmission output shaft 8 is provided as the output of the range group BG. The transmission output shaft 8 drives an axle transmission (not shown), which powers driveshafts leading to the vehicle's wheels.

Of particular importance for the drive assembly according to the invention is the clutch device 1 arranged upstream from the group transmission SG, HG, BG, since its design makes for an axially particularly short drive assembly with small radial dimensions. Whereas the starting and shifting clutch 1a designed as a friction clutch enables starting and gearshift processes sometimes involving slip, the claw clutch which engages with positive interlock enables the starting and shifting clutch 1a to be bridged across, whereby a drive torque can be transmitted along a second path into the group transmission SG, HG, BG so that gearshifts with no traction force interruption are possible.

As already mentioned, on its input side the clutch device 1 made as a dual clutch shown in FIG. 1 can be driven by the crankshaft 2 of an internal combustion engine, which is connected via a flywheel 3 to the clutch housing 10 in a rotationally fixed manner. For this, the flywheel 3 also sits on an axial spindle 4 of the transmission input shaft 5, which latter extends axially all the way through the clutch device 1.

The starting and shifting clutch 1*a* made as a friction clutch is positioned immediately adjacent to the flywheel 3. Radially on the inside it comprises a sleeve 13 connected in a rotationally fixed manner to the transmission input shaft 5, radially in the middle of which a first torsion fluctuation damper 12 is formed. The spring means of this torsion fluctuation damper 12 are, in a known way, connected radially on the outside to a clutch disk 14 which, with its friction lining, can be pressed by a pressure plate 15 axially against the flywheel 3. For this purpose the pressure plate 15 is arranged radially inside the clutch housing 10 and is axially guided on it. Annular segments 28 are provided as guiding aids, which project from the clutch housing 10 radially inward, extending with some play through radial openings 27 in the pressure plate 15, these segments having additional importance in that they co-operate with the claw clutch 1*b*.

The pressure plate 15 of the starting and shifting clutch 1*a* is constantly pushed, by a cup spring 16 attached to and able to pivot on the clutch housing 10, in the engaging direction toward the clutch disk 14, so that when not actuated the starting and shifting clutch 1*a* is engaged. To actuate and disengage the starting and shifting clutch 1*a* a pressure-medium-actuated actuator (not shown) is activated, which moves the cup spring 16 by virtue of a release bearing 17 to its disengaged position. The release bearing 17 is arranged in an actuator housing 11 common to both clutches 1*a*, 1*b*, on which it is supported. Thus, drive torque coming from the crankshaft 2 passes through to the transmission input shaft 5 via the flywheel 3, the clutch housing 10, the cup spring 16, the pressure plate 15, the clutch disk 14, the first torsion fluctuation damper 12 and the sleeve 13.

As has already been mentioned, the clutch device 1 made as a dual clutch also comprises an unsynchronized claw clutch 1*b*, which is positioned axially immediately adjacent to the starting and shifting clutch 1*a* made as a friction clutch. Radially on the inside this claw clutch 1*b* comprises a sleeve 21, radially in the middle of which a second torsion fluctuation damper 20 is formed. The sleeve 21 of the claw clutch 1*b* is connected in a rotationally fixed manner and axially secured by a retaining ring 52 on a hollow shaft 22, which is arranged on the transmission input shaft 5 with a sliding fit or, as in the example embodiment of FIG. 1, with two needle bearings 23 as roller bearings. At its end remote from the drive motor the hollow shaft 22 carries the already mentioned loose gearwheel 43, which is radially mounted on the transmission housing 68 by the roller bearing 24. In addition the hollow shaft 22 is supported axially in the area of its output gearwheel or the loose gearwheel 43, on an annular collar 25 formed on the transmission input shaft 5.

The at least one springy-elastic element 53 of the second torsion fluctuation damper 20 is connected radially on the outside to a driver disk 26 and is designed and arranged such that the driver disk 26, with its radially outer end, can be deflected axially in the direction of the already mentioned annular segments 28 on the clutch housing 10.

To produce this axial deflection of the driver disk 26, a piston 18 of a pressure-medium-actuated actuator (not shown in detail) is provided, which can be pressed with an annular axial projection 19 against the face of the driver disk 26 of the claw clutch 16 that faces away from the starting and shifting clutch 1*a*. For this purpose the piston 18 of the actuator of the claw clutch 1*b* is arranged in an area of the clutch device 1 which is covered both radially and axially by an axial extension 24 of the pressure plate 15 of the starting and shifting clutch 1*a*. The piston 18 is also fitted and able to move axially in the common actuator housing 11 by virtue of a release bearing 55, and is supported on it.

To form the shifting element of an unsynchronized claw clutch 1*b*, on its axial face directed toward the annular segments 28 the driver disk 26 has teeth 30 whose length therefore extends radially outward. Furthermore, each of the radially inward-extending annular segments 28 has corresponding teeth 29 on the end. Accordingly, actuating the piston 18 of the actuator of the claw clutch 1*b* results in an interlocked connection between the driver disk 26 and the annular segments 28, and ultimately with the clutch housing 10, so that a drive torque from the crankshaft 2 can pass via the flywheel 3, the clutch housing 10, the annular segments 28, the driver disk 26, the sleeve 21 and the hollow shaft 22, to the loose gearwheel 43 of the first gear constant K1.

If the teeth of the radial tooth arrays 29, 30 of the annular segments 28 and the driver disk 26 have inclined tooth flanks, i.e. tooth flanks inclined away from the longitudinal central axis of the drive assembly, then during the transmission of torque the claw clutch 1*b* acts automatically in a self-separating manner so that an actuating force must be maintained continuously on the piston 18 of the claw clutch actuator to keep the claw clutch 1*b* engaged.

In this embodiment it is an advantage that if the actuating force is removed the claw clutch 1*b* disengages automatically, i.e. solely due to the restoring force of the spring means 53 of the second torsion fluctuation damper 20 and the mutually repelling behavior of the teeth. Moreover, such a claw clutch 1*b* can be disengaged without a large actuating force even during the transmission of a high torque, and the bridging of the starting and shifting clutch 1*a* eliminated thereby. For this, the arrangement of the shifting elements (radial teeth 29, 30) on a large effective diameter is particularly advantageous.

Besides the radial orientation of the teeth 29, 30 on the annular segments 28 and on the driver disk 26 as explained for the example embodiment of FIG. 1, in another embodiment these can also be formed as axial teeth.

If the restoring force of the springy element 53 of the second torsion fluctuation damper 20 on the driver disk 26 or on the piston 18, 19 of the claw clutch 1*b* is not sufficient to return them to their non-actuating position if necessary, then in a simply designed manner at least one other restoring spring can be provided for the purpose. In the absence of an actuating pressure in the actuator of the claw clutch 1*b* this pushes the actuating piston 18 actively to its non-actuating position, so that the teeth 29, 30 on the annular segments 28 and on the driver disk 26 move out of engagement.

It has been made clear that due to the arrangement of the claw clutch 1*b* outside the transmission housing, i.e. in the dry space or clutch housing 10 of the starting and shifting clutch 1*a*, no actuators on the transmission side of the internal combustion engine itself are needed to engage or disengage the claw clutch. This too advantageously shortens the drive-train and reduces the complexity of the transmission SG, HG, BG.

Furthermore, with the clutch arrangement 1 proposed the claw clutch 1*b* can be combined as a module with an already existing starting and shifting clutch 1*a*, whereby the claw clutch 1*b* can be integrated on one side in the clutch housing 10. Moreover, the design of the clutch arrangement with a starting and shifting clutch 1*a* and a claw clutch 1*b* can be derived from an already existing dual clutch.

With a group transmission having a splitter transmission SG on the input side with two gear constants K1, K2, the structure of the clutch assembly 1 described with reference to FIG. 1 enables, for example, a gearshift to be carried out between the highest gear and the second-highest gear of the group transmission without any traction force interruption, concerning which more will be said later in connection with the method for operating drive assemblies according to the invention.

Figure 2:
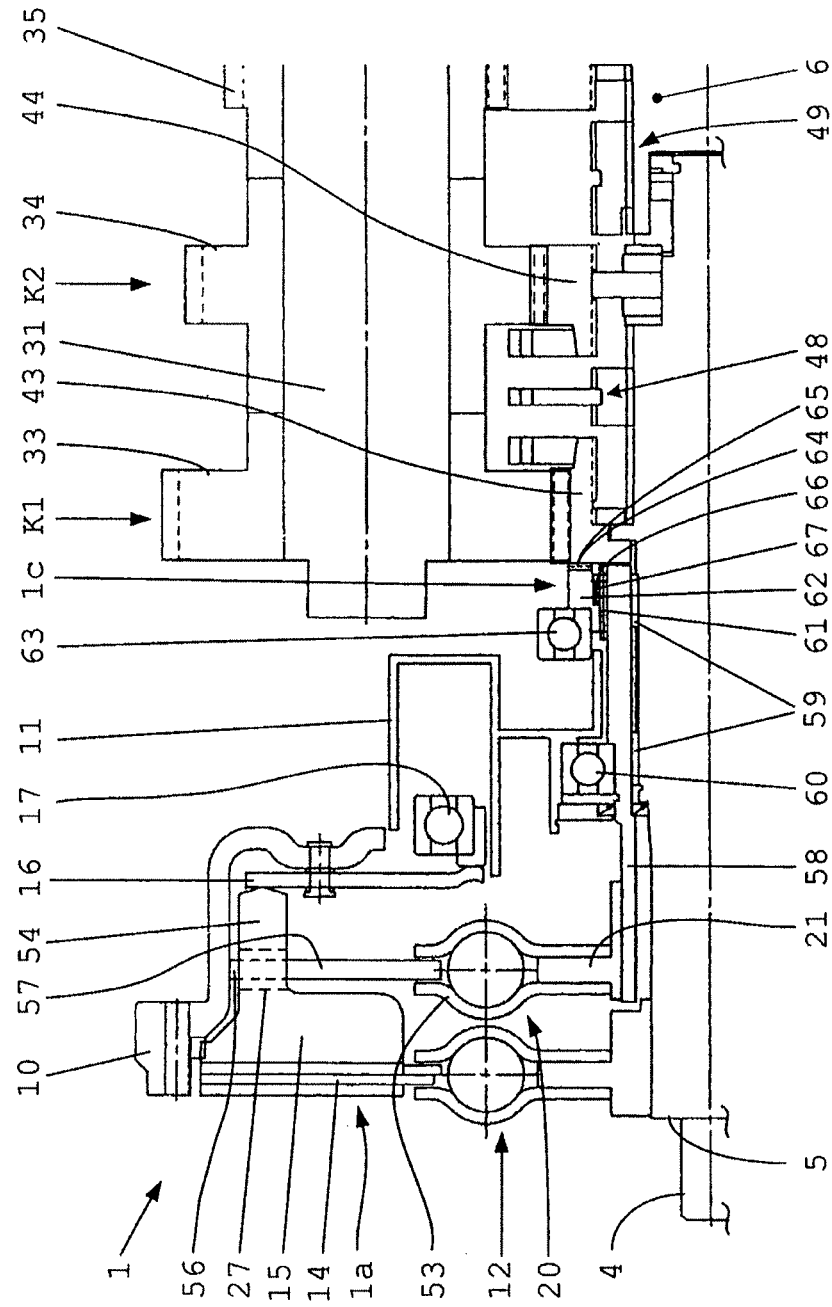
FIG. 2: Part of a schematic longitudinally sectioned view through a drive assembly of a motor vehicle in the area of a clutch device configured differently from that shown in FIG. 1.

FIG. 2 shows a drive assembly which, with regard to the group transmission SG, HG, BG and with regard to the starting and shifting clutch 1a made as a friction clutch, is configured largely identically to that of FIG. 1. To that extent, almost all the advantages mentioned apply in the case of this drive assembly according to FIG. 2 as well. Only the drive input to the first gear constant K1 and, associated with this, the design of the claw clutch 1c differ from the drive assembly according to FIG. 1.

As in the drive assembly of FIG. 1, in the starting and shifting clutch 1a the pressure plate 15 or its axial extension 54 has radially directed openings 27, preferably evenly distributed around the circumference of the pressure plate 15. Through the openings 27 project radial webs 56 of the driver disk 57, which are connected in a rotationally fixed manner to the clutch housing 10. Accordingly, when the vehicle's motor is running a drive torque is always passed by the clutch housing 10 to the driver disk 57 of the claw clutch 1c and farther on from there via the second torsion fluctuation damper 53 and a sleeve 21. The sleeve 21 is connected in a rotationally fixed manner to a hollow shaft 58, which is mounted to rotate on the transmission input shaft 5 by virtue of a two-row needle bearing 59. Radially on the outside of the hollow shaft 58 is arranged a roller bearing 60 in the form of a grooved ball bearing, whose outer ring is supported on the housing 11 of the actuator and of the release bearing 17 of the starting and shifting clutch 1a.

To form the shifting means of a claw clutch 1c, at its end remote from the drive motor the hollow shaft 58 has axial teeth 61 radially on the outside, on which a shifting ring 62 with its axial inner teeth is arranged and able to move axially. This shifting ring 62 is actuated by means of an actuator (not shown here) whose control element acts upon a release bearing 63 whose inner ring sits on an annular step of the shifting ring 62.

On its face directed toward the loose gearwheel 43 of the first gear constant K1 the shifting ring 62 has radially extending teeth 64 which can engage in corresponding radial teeth 65 on the face of the loose gearwheel 43 directed toward the starting and shifting clutch 1a. A spring 67 arranged radially between the outer axial teeth 61 of the hollow shaft 58 and the shifting ring 62, is supported axially on the shifting ring 62 and on an abutment 66 inserted in the form of a retaining ring into an annular groove in the outer axial teeth 61 of the hollow shaft 58. The loose gearwheel 43 of the first gear constant K1 is mounted to rotate on the transmission input shaft 5 and, in order to transmit a drive torque via the first gear constant K1, can be connected to the transmission input shaft 5 in a rotationally fixed manner by means of the shifting device 48.

Below, the operating mode of the drive assemblies according to the invention shown in FIGS. 1 and 2 is explained, both assemblies having in common that the frictional starting and shifting clutch 1a, in relation to transmitting a drive torque to the vehicle transmission SG, HG, BG, can be bridged over by the claw clutch 1b, 1c. Furthermore, both of the drive assemblies described can drive the first gear constant K1 by means of the starting and shifting clutch 1a or by means of the claw clutch 1b, 1c, whereas the second gear constant K2 can only be driven by the starting and shifting clutch 1a.

To carry out a shifting process free from traction force interruption in these drive assemblies that comprise a group transmission SG, HG and a friction clutch 1a as well as a claw clutch 1b, 1c, regardless of the specific embodiment variant according to FIGS. 1 and 2 it is provided that:

in a first step the drive torque is passed exclusively along a first torque path that includes the frictional starting and shifting clutch 1a, the transmission input shaft 5, the loose gearwheel 44 of the second gear constant K2 and the main transmission shaft 6, in a second step the starting and shifting clutch 1a is operated with slip, and the input side of the clutch device 1 is brought close to a target rotational speed of the target gear, in a third step the claw clutch 1b, 1c is engaged and the drive torque is passed along the first torque path and also along a second torque path, this second torque path including the claw clutch 1b or 1c, the loose gearwheel 43 of the first gear constant K1, the fixed gearwheels 33, 38; 34, 39 of the first and second gear constants K1, K2, the loose gearwheel 44 of the second gear constant K2 and the main transmission shaft 6, and in a fourth step the starting and shifting clutch 1a is disengaged and the drive torque is passed exclusively to the main transmission shaft 6 along the second torque path that contains the claw clutch 1b; 1c.

To produce the first torque path, with the starting and shifting clutch 1a engaged the transmission input shaft 5 is connected in a rotationally fixed manner to the loose gearwheel 44 of the second gear constant K2 by means of a shifting device 48 arranged between the two gear constants K1, K2, and in addition this loose gearwheel 44 of the second gear constant K2 is connected in a rotationally fixed manner to the main transmission shaft 6 by means of a further shifting device 49.

To produce the second torque path, with the claw clutch 1b, 1c engaged and the loose gearwheel 43 of the first gear constant K1 driven by the output side of the claw clutch 1b, 1c, and with the first shifting device 48 disengaged, the loose gearwheel 44 of the second gear constant K2 is connected to the main transmission shaft 6 in a rotationally fixed manner by means of the further shifting device 49.

The claw clutch 1b, 1c is preferably engaged shortly before the target speed of the new transmission gear has been reached, in order to avoid a rotational speed overshoot. The shifting device 48 arranged between the two gear constants K1, K2 can then remain in its shifting position on the loose gearwheel 44 of the second gear constant K2, or be returned to its neutral position. If after the claw clutch 1b, 1c has been engaged the shifting device 48 is brought to its neutral position, the starting and shifting clutch 1a can then be engaged and its pressure-medium-operated actuator thereby relaxed.

Below, it will be described how a traction downshift from the $12^{th}$ and therefore highest transmission gear to the $11^{th}$ gear can be carried out in a drive assembly according to FIG. 1, without interrupting the torque transmission between the transmission input and the transmission output.

With the $12^{th}$ gear engaged, the drive torque coming from the vehicle's motor passes via the clutch housing 10, the engaged frictional starting and shifting clutch 1a, the transmission input shaft 5, the sliding sleeve of the shifting device 48 pushed to the right toward the loose gearwheel 44 of the second gear constant K2, the loose gearwheel 44, the sliding sleeve of the shifting device 49 pushed to the left toward the loose gearwheel 44 of the second gear constant K2 and the main transmission shaft 6, to the range transmission BG and from there to the transmission output shaft 8. Since by virtue of the associated fixed gearwheels 34, 39 the loose gearwheel 44 of the second gear constant K2 also drives the countershafts 31, 32, ultimately the loose gearwheel 43 of the first gear constant K1 as well is driven by the fixed gearwheels 33, 38 associated with it. During this the claw clutch 1b is disengaged but its input-side shifting means, i.e. the annular segments 28 on the clutch housing 10 projecting radially inward, are driven together with the clutch housing 10 by the drive motor at the rotational speed of the motor.

To carry out a traction downshift without traction force interruption from the $12^{th}$ to the $11^{th}$ gear, first the starting and shifting clutch 1a is brought for a short time to slipping operation and by acting upon the power control element of the vehicle's motor the rotational speed of the transmission input shaft 5 is increased to the target speed of the $11^{th}$ gear.

Thereafter, the claw clutch 1b is engaged by actuating the piston 19 so that the starting and shifting clutch 1a and the claw clutch 1b each transmit part of the drive torque. Then the sliding sleeve of the shifting device 48 is moved clear of the loose gearwheel 44 of the second gear constant K2 and pushed to its neutral position.

The starting and shifting clutch 1a is now fully disengaged so that it is exclusively the claw clutch 1b which transmits the drive torque via the first gear constant K1 to the two countershafts 31, 32 and from there, via the gearwheels 34, 44 of the second gear constant K2, to the main transmission shaft 6.

Linked to the above, it will now be described how a traction downshift from the $12^{th}$ and highest gear to the $11^{th}$ gear can be carried out in a drive assembly according to FIG. 2 without interrupting the torque transmission between the transmission input and the transmission output.

With the $12^{th}$ gear engaged, the drive torque coming from the vehicle's motor is passed via the clutch housing 10, the engaged starting and shifting clutch 1a, the transmission input shaft 5, the sliding sleeve of the shifting device 48 pushed to the right toward the loose gearwheel 44 of the second gear constant K2, the loose gearwheel 44, the sliding sleeve of the shifting device 49 pushed to the left toward the loose gearwheel 44 of the second gear constant K2 and the main transmission shaft 6, to the range transmission BG and from there to the transmission output shaft 8. Since the loose gearwheel 44 of the second gear constant K2 also drives the countershafts 31, 32 via the associated fixed gearwheels 34, 39, ultimately the loose gearwheel 43 of the first gear constant K1 as well is driven by the fixed gearwheels 33, 38 associated with it. During this the claw clutch 1c is disengaged but its input, i.e. the driver disk 57, the torsion fluctuation damper 20, the hollow shaft 58 and the shifting ring 62 are driven by the vehicle's motor via the clutch housing 10 at the rotational speed thereof.

To carry out a traction downshift from the $12^{th}$ to the $11^{th}$ gear without traction force interruption, the starting and shifting clutch 1a is first brought for a short time to slipping operation and, by acting upon the power control element of the vehicle's motor, the speed of the transmission input shaft 5 is increased to the target speed of the $11^{th}$ gear.

Then the claw clutch 1c is engaged so that the torque is transmitted in part by both the starting and shifting clutch and the claw clutch 1c. Thereafter the sliding sleeve of the shifting device 48 is moved clear of the loose gearwheel 44 of the second gear constant K2 and pushed to its neutral position. Then the starting and shifting clutch 1a is fully disengaged so that it is exclusively the claw clutch 1c which now transmits the drive torque via the countershafts 31, 32 to the main transmission shaft 6.

INDEXES

1 Clutch device
1a Starting and shifting clutch, frictional clutch
1b Claw clutch
1c Claw clutch
2 Crankshaft
3 Flywheel
4 Spindle on the transmission input shaft
5 Transmission input shaft
6 Main transmission shaft
7 Planetary transmission
8 Transmission output shaft
9 Screw connection
10 Clutch housing
11 Actuator housing
12 First torsion fluctuation damper
13 Sleeve of the first torsion fluctuation damper
14 Clutch disk of the starting and shifting clutch
15 Pressure plate of the starting and shifting clutch
16 Cup spring of the actuator of the starting and shifting clutch
17 Release bearing of the actuator of the starting and shifting clutch
18 Piston of the actuator of the claw clutch
19 Axial projection of the piston 18
20 Second torsion fluctuation damper
21 Sleeve of the second torsion fluctuation damper
22 Hollow shaft
23 Roller bearing, needle bearing
24 Roller bearing
25 Annular collar
26 Driver disk on the second torsion fluctuation damper
27 Radial opening in the pressure plate of the starting and shifting clutch
28 Annular segment of the claw clutch
29 Radial teeth on the annular segment 28
30 Radial teeth on the driver disk 26
31 First countershaft
32 Second countershaft
33, 34, 35, 36, 37 Fixed gearwheel on the first countershaft
38, 39, 40, 41, 42 Fixed gearwheel on the second countershaft
43 Loose gearwheel on the transmission input shaft, drive input gearwheel of K1
44 Loose gearwheel on the transmission input shaft
45, 46, 47 Loose gearwheel on the main transmission shaft
48 Shifting device
49 Shifting device
50 Shifting device
51 Roller bearing
52 Retaining ring
53 Springy-elastic element on the second torsion fluctuation damper
54 Axial extension of the pressure plate 15
55 Release bearing of the actuator of the claw clutch
56 Radial webs of the driver disk 57
57 Driver disk of the claw clutch
58 Hollow shaft
59 Needle bearing
60 Roller bearing, grooved ball bearing
61 Outer axial teeth on the hollow shaft 58
62 Shifting ring of the claw clutch
63 Release bearing of the claw clutch
64 Radial teeth on the shifting ring
65 Radial teeth on the loose gearwheel or drive input gearwheel 43 of K1
66 Stop abutment for the spring 67

67 Restoring spring
68 Transmission housing
SG Splitter transmission
HG Main transmission
BG Range transmission
K1 First gear constant
K2 Second gear constant

The invention claimed is:

1. A drive assembly for a motor vehicle with a group transmission that can be powershifted, the group transmission comprising a splitter transmission (SG) and a main transmission (HG), the drive assembly comprising:
   the group transmission (SG, HG) comprising a transmission input shaft (5), at least one other transmission shaft (6, 31, 32) and a transmission output shaft (8),
   loose gearwheels and fixed gearwheels, for form transmission gears, being arranged on the transmission shafts (5, 6, 31, 32),
   shifting devices (48, 49, 50) for coupling the loose gearwheels (43, 44, 45, 46, 47) in a rotationally fixed manner to at least one of the transmission shafts (5, 6),
   the splitter transmission (SG) having at least a first gear constant (K1) and a second gear constant (K2),
   input sides of the first and the second gear constants (K1, K2) being drivable by output sides of a clutch device (1) comprising two clutches,
   input sides of the two clutches being drivable by a drive motor,
   one of the two clutches of the clutch device (1) being a frictional starting and shifting clutch (1a) and the other of the two clutches being a positively interlocking claw clutch (1b, 1c),
   the input sides of the first and the second gear constants (K1, K2) being alternatively drivable by the output side of the starting and shifting clutch (1a), and
   the input side of only one of the gear constants (K1) being drivable by the output side of the claw clutch (1b; 1c).

2. The drive assembly according to claim 1, wherein at least one other transmission shaft (6, 31, 32) comprises a main transmission shaft (6) and two countershafts (31, 32), and the splitter transmission (SG) and the main transmission (HG) are structurally combined and comprise the transmission input shaft (5), the main transmission shaft (6) and the two countershafts (31, 32) arranged parallel thereto.

3. The drive assembly according to claim 1, wherein the clutch device (1) is a dual clutch comprising the starting and shifting clutch (1a), the claw clutch (1b) and two clutch actuators respectively associated with the two clutches (1a, 1b), the two clutches (1a, 1b) have a common clutch housing (10) and a common actuator housing (11), and coupling means (28, 29) of the claw clutch (16) is arranged on a radially outside area of the clutch housing (10).

4. The drive assembly according to claim 1, wherein the starting and shifting clutch (1a) comprises, on an input side, a cup spring (16) which is fixed on a clutch housing (10) and is actuatable by a control element of an actuator, the starting and shifting clutch (1a) comprises a pressure plate (15) which, in a non-actuated condition of the starting and shifting clutch (1a), is acted upon by an engaging force, and the pressure plate (15) has radial openings (27) through which annular segments (28), arranged on the clutch housing (10), project radially inward with play.

5. The drive assembly according to claim 3, wherein the starting and shifting clutch (1a) and the claw clutch (1b) each comprise a respective torsion fluctuation damper (12, 20) which are arranged radially inside the clutch housing (10).

6. The drive assembly according to claim 5, wherein an output side of the torsion fluctuation damper (12) of the starting and shifting clutch (1a) is connected by a sleeve (13) to the transmission input shaft (5), and a shifting device (48) is arranged on the transmission input shaft (5) so that the transmission input shaft (5) is connectable alternatively to either a loose gearwheel (43) of the first gear constant (K1) or a loose gearwheel (44) of the second gear constant (K2).

7. The drive assembly according to claim 5, wherein the torsion fluctuation damper (20) of the claw clutch (16) is connected, in a rotationally fixed manner, to a hollow shaft (22) arranged radially within the torsion fluctuation damper (20) of the claw clutch (16), the hollow shaft (22) is mounted and rotatable on the transmission input shaft (5), the torsion fluctuation damper (20) comprises at least one spring element (53) and radially, on an outside the torsion fluctuation damper (20), is connected to a driver disk (26) which has radial teeth (30) in an area of its radial end.

8. The drive assembly according to claim 4, wherein the annular segments (28) are arranged radially on an inside of the clutch housing (10) and are connected thereto in a rotationally fixed manner.

9. The drive assembly according to claim 4, wherein the annular segments have radial teeth (29) on a face thereof which is directed axially toward the drive disk (26).

10. The drive assembly according to claim 4, wherein, in a coupled condition of the claw clutch (16), the radial teeth (29, 30) of the annular segments (28) and the driver disk (26) engage in one another.

11. The drive assembly according to claim 7, wherein the claw clutch (1b) comprises an actuating piston (18) of an associated actuator which, to engage the claw clutch (1b), is forced axially against a face of a drive disk (26) without teeth, and at least one springy-elastic element (53) of the second torsion fluctuation damper (20) is designed so as to enable axial deflection of the driver disk (26).

12. The drive assembly according to claim 11, wherein the at least one springy-elastic element (53) of the second torsion fluctuation damper (20) is designed such that in a non-actuated condition the actuating piston (18), of the actuator of the claw clutch (1b), is pushed by the springy-elastic element (53) to a disengaging position.

13. The drive assembly according to claim 7, wherein the hollow shaft (22) has a gearwheel (43), at an end adjacent the transmission, which serves as the loose gearwheel (43) of the first gear constant (K1) of the splitter group transmission (SG).

14. The drive assembly according to claim 13, wherein the hollow shaft (22) is supported by a needle bearing (23), on the transmission input shaft (5), and by a grooved ball bearing (24), on a transmission housing (68).

15. The drive assembly according to claim 1, wherein the claw clutch (1b) is arranged both radially and axially within a space of an axial extension (54) of a pressure plate (15) of the frictional starting and shifting clutch (1a).

16. The drive assembly according to claim 4, wherein radial teeth (29, 30) on the annular segments (28) and on a driver disk (26) have axially directed inclined tooth flanks.

17. The drive assembly according to claim 1, wherein, in the clutch device (1), the starting and shifting clutch (1a) complete and the input side and a torsion fluctuation damper (20) of the claw clutch (1b) are arranged within a clutch housing (10), and an actuator for the starting and shifting clutch (1a) is arranged in an actuator housing (11) connected to the clutch housing (10), and coupling means (64, 65) for the claw clutch (1c) are either arranged or formed in an area of the loose gearwheel (43) of the first gear constant (K1).

18. The drive assembly according to claim 17, wherein, at an end adjacent the transmission, a hollow shaft (58), connected to the torsion fluctuation damper (20) of the claw clutch (1c), has outer axial teeth (61), and on these outer axial teeth (61) a shifting ring (62) with its axially inner teeth is fitted and able to move, and on its face directed toward the loose gearwheel (43) of the first gear constant (K1) a shifting ring (62) of the first gear constant (K1) has radial teeth (64), and corresponding radial teeth (65) are formed on the loose gearwheel (43) of the first gear constant (K1).

19. The drive assembly according to claim 18, wherein the shifting ring (62) of the claw clutch (1c) is axially displacable by an actuator and is supported on a transmission housing (68) by a release bearing (63).

20. The drive assembly according to claim 17, wherein the shifting ring (62) is acted upon by a restoring spring (67) with a force directed away from the loose gearwheel (43) of the first gear constant (K1).

21. The drive assembly according to claim 17, wherein radial teeth (64, 65), on the shifting ring (62) and on the loose gearwheel (43), have axially directed inclined tooth flanks.

22. A method of operating a drive assembly with a group transmission that can be powershifted, the group transmission comprising a splitter transmission (SG) and a main transmission (HG), the drive assembly comprises the group transmission (SG, HG) comprising a transmission input shaft (5), at least one other transmission shaft (6, 31, 32) and a transmission output shaft (8), loose gearwheels and fixed gearwheels, for form transmission gears, being arranged on the transmission shafts (5, 6, 31, 32), shifting devices (48, 49, 50) for coupling the loose gearwheels (43, 44, 45, 46, 47) in a rotationally fixed manner to at least one of the transmission shafts (5, 6), the splitter transmission (SG) having at least a first gear constant (K1) and a second gear constant (K2), input sides of the first and the second gear constants (K1, K2) being drivable by output sides of a clutch device (1) comprising two clutches, input sides of the two clutches being drivable by a drive motor, one of the two clutches of the clutch device (1) being a frictional starting and shifting clutch (1a) and the other of the two clutches being a positively interlocking claw clutch (1b, 1c), the input sides of the first and the second gear constants (K1, K2) being alternatively drivable by the output side of the starting and shifting clutch (1a), and the input side of only one of the gear constants (K1) being drivable by the output side of the claw clutch (1b; 1c), the method comprising the steps of:
 transmitting drive torque to carry out a shifting process in the group transmission (SG, HG) without traction force interruption, exclusively along a first torque path that comprises the frictional starting and shifting clutch (1a), the transmission input shaft (5), the loose gearwheel (44) of the second gear constant (K2) and the main transmission shaft (6);
 bringing the starting and shifting clutch (1a) into a slipping operation and bringing the rotational speed of the input side of the clutch device (1) close to a target speed for the target gear;
 engaging the claw clutch (1b, 1c) and transmitting the drive torque along the first torque path and also along a second torque path, the second torque path containing the claw clutch (1b, 1c), the loose gearwheel (43) of the first gear constant (K1), the fixed gearwheels (33, 38; 34, 39) of the first gear constant (K1) and the second gear constant (K2), the loose gearwheel (44) of the second gear constant (K2) and the main transmission shaft (6); and
 disengaging the starting and shifting clutch (1a) and transmitting the drive torque to the main transmission shaft (6) exclusively along the second torque path that includes the claw clutch (1b; 1c).

23. The method according to claim 22, further comprising the step of producing the first torque path, with the starting and shifting clutch (1a) engaged by connecting the transmission input shaft (5) in a rotationally fixed manner to the loose gearwheel (44) of the second gear constant (K2) via a shifting device (48) arranged between the first and the second gear constants (K1, K2), and in addition connecting the loose gearwheel (44) of the second gear constant (K2) in a rotationally fixed manner to the main transmission shaft (6) by a further shifting device (49).

24. The method according to claim 22, further comprising the step of producing the second torque path, with the claw clutch (1b, 1c) engaged, driving the loose gearwheel (43) of the first gear constant (K1) by the output side of the claw clutch (1b, 1c) and the first shifting device (48) disengaged, by connecting the loose gearwheel (44) of the second gear constant (K2) in a rotationally fixed manner to the main transmission shaft (6) by means of the further shifting device (49).

25. The method according to claim 22, further comprising the step of, once the claw clutch (1b, 1c) is engaged, moving the shifting device (48) between the first and the second gear constants (K1, K2) out of its engaged position on the loose gearwheel (44) of the second gear constant (K2) to a neutral position.

26. The method according to claim 22, further comprising the step of engaging the starting and shifting clutch (1a) once the shifting device (48) is moved to a neutral position.

* * * * *